United States Patent
Wen et al.

(10) Patent No.: US 7,663,268 B2
(45) Date of Patent: Feb. 16, 2010

(54) CONVERTERS FOR HIGH POWER APPLICATIONS

(75) Inventors: Jun Wen, Irvine, CA (US); Keyue Smedley, Aliso Viejo, CA (US)

(73) Assignee: The Regents of the University of Cailfornia, Oakland, CA (US)

( * ) Notice: Subject to any disclaimer, the term of this patent is extended or adjusted under 35 U.S.C. 154(b) by 211 days.

(21) Appl. No.: 11/845,653

(22) Filed: Aug. 27, 2007

(65) Prior Publication Data
US 2008/0055947 A1 Mar. 6, 2008

Related U.S. Application Data

(60) Provisional application No. 60/823,939, filed on Aug. 30, 2006.

(51) Int. Cl.
*H02J 1/00* (2006.01)
(52) U.S. Cl. ............... 307/82; 307/18; 307/29
(58) Field of Classification Search .................. 307/82, 307/18, 29; 363/70
See application file for complete search history.

(56) References Cited

U.S. PATENT DOCUMENTS

| | | | |
|---|---|---|---|
| 2,775,733 A | 12/1956 | Winograd | |
| 4,451,773 A | 5/1984 | Papathomas et al. | |
| 5,986,909 A * | 11/1999 | Hammond et al. | 363/65 |
| 6,014,323 A * | 1/2000 | Aiello et al. | 363/71 |
| 6,301,130 B1* | 10/2001 | Aiello et al. | 363/37 |
| 6,320,767 B1* | 11/2001 | Shimoura et al. | 363/37 |
| 6,545,887 B2 | 4/2003 | Smedley et al. | |
| 6,704,182 B2* | 3/2004 | Bruckmann et al. | 361/91.1 |
| 6,859,374 B2 | 2/2005 | Pollanen et al. | |
| 6,900,997 B2* | 5/2005 | Perreault et al. | 363/127 |
| 6,954,366 B2* | 10/2005 | Lai et al. | 363/71 |
| 7,298,197 B2* | 11/2007 | Duerbaum et al. | 327/416 |
| 7,330,363 B2 | 2/2008 | Ponnaluri et al. | |
| 7,365,451 B2* | 4/2008 | Aritsuka | 307/17 |
| 7,414,866 B2* | 8/2008 | Zhang | 363/43 |

* cited by examiner

*Primary Examiner*—Shawn Riley
(74) *Attorney, Agent, or Firm*—Orrick, Herrington & Sutcliffe LLP

(57) ABSTRACT

Multilevel high power converters, referred to as hexagram converters, which preferably include a combination of six three-phase converter modules, are provided herein. The three-phase converter modules are interconnected and can be configured as any three-phase converter for any given application. One or more inductors can be used in the interconnections between the six modules to suppress potential circulating currents. Numerous applications exist in which the described converters can be implemented.

22 Claims, 16 Drawing Sheets

CONVERTERS FOR HIGH POWER APPLICATIONS

RELATED APPLICATION

This application claims priority to U.S. Provisional Application Ser. No. 60/823,939, filed Aug. 30, 2006, and is fully incorporated hereby by reference.

FIELD OF THE INVENTION

The present invention relates to power converters and, more particularly, to converters for high power applications.

BACKGROUND OF THE INVENTION

Power electronics are finding increasing market space in industrial applications due to their imminent advantages in adjustable speed motor drives (ASD), unity power factor rectifications (PFC), active power filtering (APF), static var compensation (STATCOM), as well as unified power flow control (UPFC). Presently, most of their applications are in the low to medium power range from 5 kilowatts (kW) to 250 kW at the low voltage line of 208-480 volts (V), since high speed semiconductors such as insulated gate bipolar transistor (IGBT), MCT, and the like are readily available for these power and voltage levels. It is still a challenge to connect basic power converters, built from these types of semiconductor switches, directly to the medium-voltage grids (e.g., 2.3, 3.3, 4.16, 6.9 kV and the like). Solutions that allow connection to high power grids, such as silicon-carbide (SIC) switches, are still unproven and will take some time before introduction into commercial applications. Instead, research and development has focused on multilevel converters, which have emerged as a new breed of power converter options for high power applications.

Currently, the diode-clamped multilevel converter and cascaded H-bridge are the two most frequently used multilevel converter topologies. The diode-clamped multilevel converter, also called the neutral point clamped (NPC) converter, prevailed in the 1980's and found its applications in power factor correction, reactive power compensation, back-to-back intertie, adjustable speed motor drives, and unified power flow control. However, only a limited number of levels are achievable, due to the unbalanced voltage issues in the capacitors and also due to voltage clamping requirements, circuit layout, and packaging constraints.

The cascaded H-bridge has drawn considerable interest since the mid-1990s, and has been used for ASD and reactive power compensation. The modular structure provides advantages in power scalability and maintenance and fault tolerance can be achieved by bypassing the fault modules. Unfortunately, this technology requires a large number of single-phase modules accompanied by a transformer with a large number of isolated secondary windings, resulting in high manufacturing costs. Moreover, due to its single-phase nature, each converter module processes pulsating power, resulting in a high energy storage requirement, especially in low speed, constant torque applications.

Thus, it is desirable to provide low cost converters suitable for high power applications.

SUMMARY

Provided herein are converters for use in high power applications and methods for using the same. These converters and methods are provided by way of exemplary embodiments and in no way should be construed to limit the claims beyond the language that appears expressly therein.

Described herein are multilevel high power converters, referred to as hexagram converters, which preferably include a combination of six three-phase converter modules. The three-phase converter modules can be configured as any three-phase converter and each can have the same configuration or the configuration can vary among them for any given application. One or more inductors can be used in the interconnections between the six modules to suppress potential circulating currents. Numerous applications exist in which the described converters can be implemented, the entirety of which is not practice to describe herein.

Other systems, methods, features and advantages will be or will become apparent to one with skill in the art upon examination of the following figures and detailed description. It is intended that all such additional systems, methods, features and advantages be included within this description, be within the scope of the systems and methods described herein, and be protected by the accompanying claims.

BRIEF DESCRIPTION OF THE FIGURES

The details of the invention, both as to its structure and operation, may be gleaned in part by study of the accompanying figures, in which like reference numerals refer to like parts. The components in the figures are not necessarily to scale, emphasis instead being placed upon illustrating the principles of the inventions. Moreover, all illustrations are intended to convey concepts, where relative sizes, shapes and other detailed attributes may be illustrated schematically rather than literally or precisely.

FIGS. 3A-5B are schematic views depicting additional exemplary embodiments of the hexagram converter configured for operation in various applications.

FIGS. 5C-6 are schematic views depicting exemplary embodiments of a rectifier and converter module.

DETAILED DESCRIPTION

Provided herein are multiple exemplary embodiments of multilevel converters and methods for using the same. These converters can be used in a wide variety of applications, certain examples of which will also be described herein. These multilevel converters provide significant advantages over conventional converters including, but not limited to, a more modular structure, lower component counts, automatic balance, relatively easier control and greater built-in fault redundancy.

Figure 1:
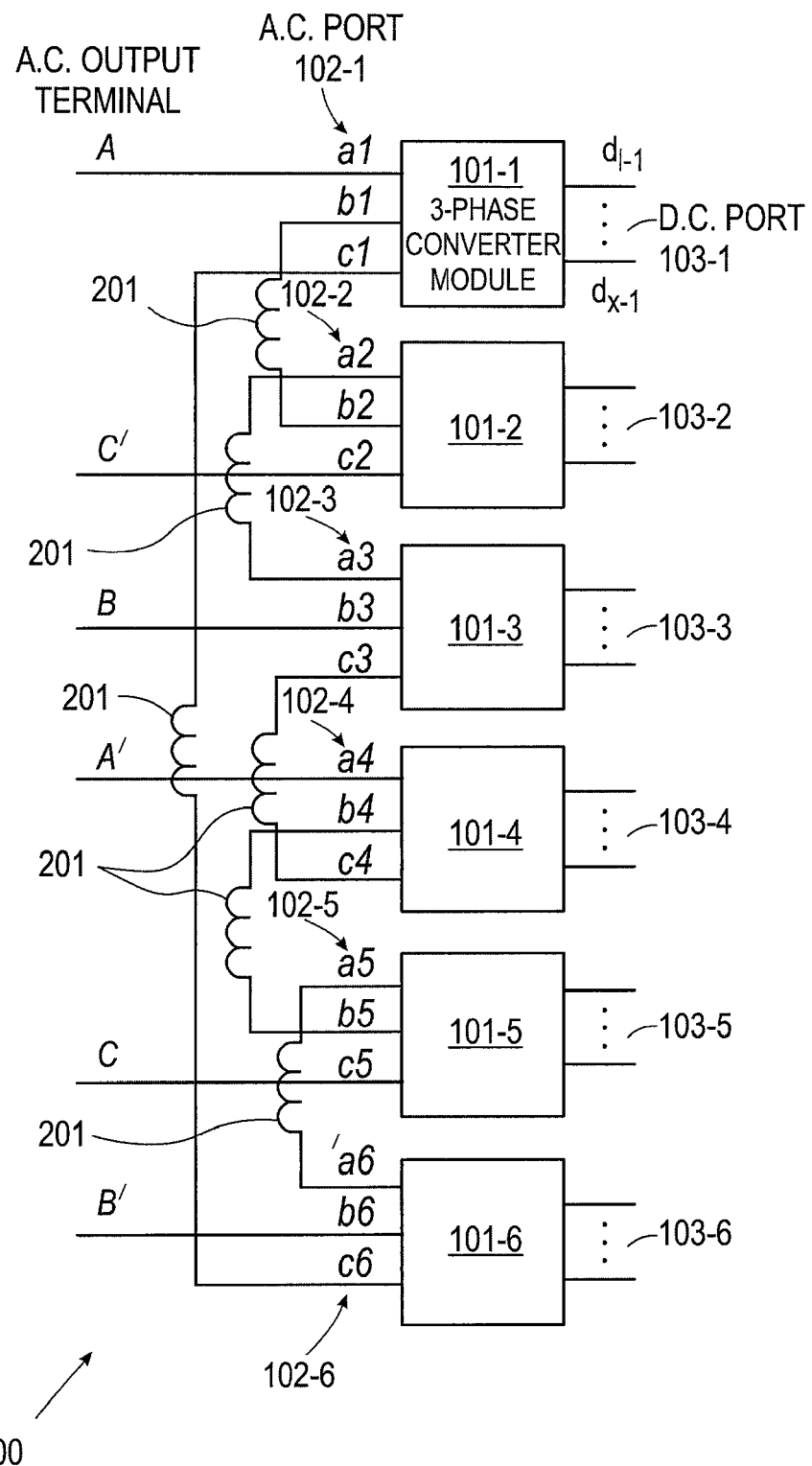
FIG. 1 is a schematic view depicting an exemplary embodiment of the hexagram converter.

FIG. 1 is a schematic view depicting a first exemplary embodiment of multilevel converter 100, which, for ease of discussion, will be referred to herein in a non-limiting manner as hexagram converter 100. Hexagram converter 100 preferably includes six three-phase converter modules 101. Converter 100 can be configured such that each module 101 lies in a main power path and consumes one-sixth of the converter 100's output power. In some cases, when multiple versions of a similar component or structure are present in the figures, such as the three-phased converter modules 101, each will be referred to with the convention yyy-z, where y corresponds to the reference numeral of the type of component and z denotes a specific one of the various components. In this embodiment, each converter module 101 includes an AC port 102 and a DC port 103. Each port 102 preferably includes three AC terminal nodes a, b, and c. Each port 103 can include x DC terminal nodes $d_z$, where x is preferably greater than or equal to two and z corresponds to a specific instance of the terminal node. The number of terminal nodes d is dependent upon the needs of the individual application. The DC terminal nodes d of each DC port 103 can be coupled with isolated DC sources, loads, or can be left open, depending upon the needs of the application.

In this embodiment, each converter module 101 has one of its AC terminal nodes (a, b or c) designated as an output terminal node. Here, the output terminal nodes of the various converters modules 101 are labeled A (AC terminal node a1 of module 101-1), A' (AC terminal node a4 of module 101-4), B (AC terminal node b3 of module 101-3), B' (AC terminal node b6 of module 101-6), C (AC terminal node c5 of module 101-5) and C' (AC terminal node c2 of module 101-2). Each of these AC output terminal nodes are preferably connected to circuitry outside of converter 100 by way of zero, one, or more inductors. The other two AC terminal nodes of each module 101 are each respectively connected to an adjacent module 101 by way of zero, one, or more inductors 201. A resistive component can be included in series with the inductors 201, if desired. For instance, in this embodiment, AC terminal node b1 of module 101-1 is coupled with AC terminal node b2 of module 101-2 by way of an inductor 201. AC terminal node c1 of module 101-1 is coupled with AC terminal node c6 of module 101-6 also by a separate inductor 201. The remaining modules include similar connections as shown in FIG. 1.

Figure 2A:
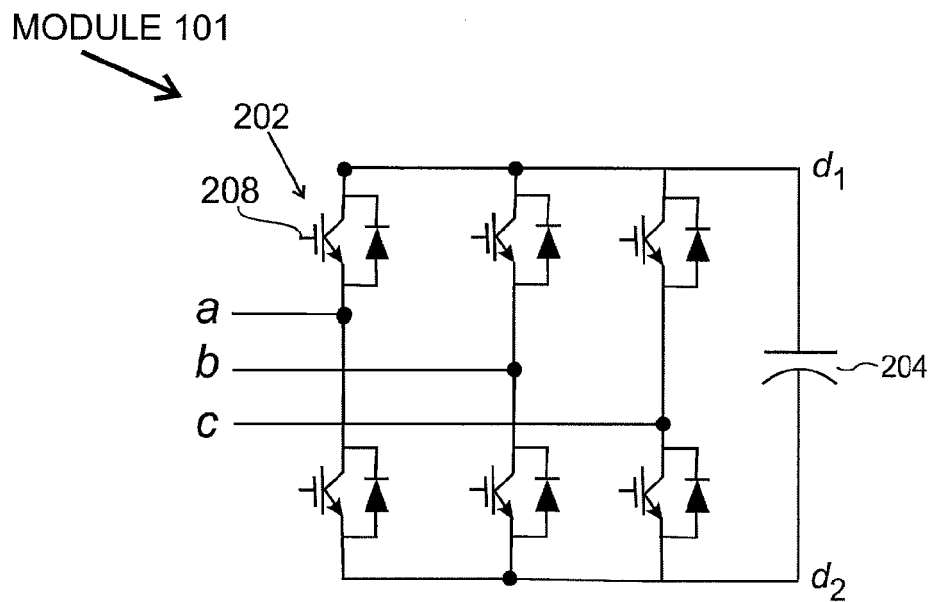
FIGS. 2A-B are schematic views depicting exemplary embodiments of a converter module for use in the hexagram converter.
Figure 2B:
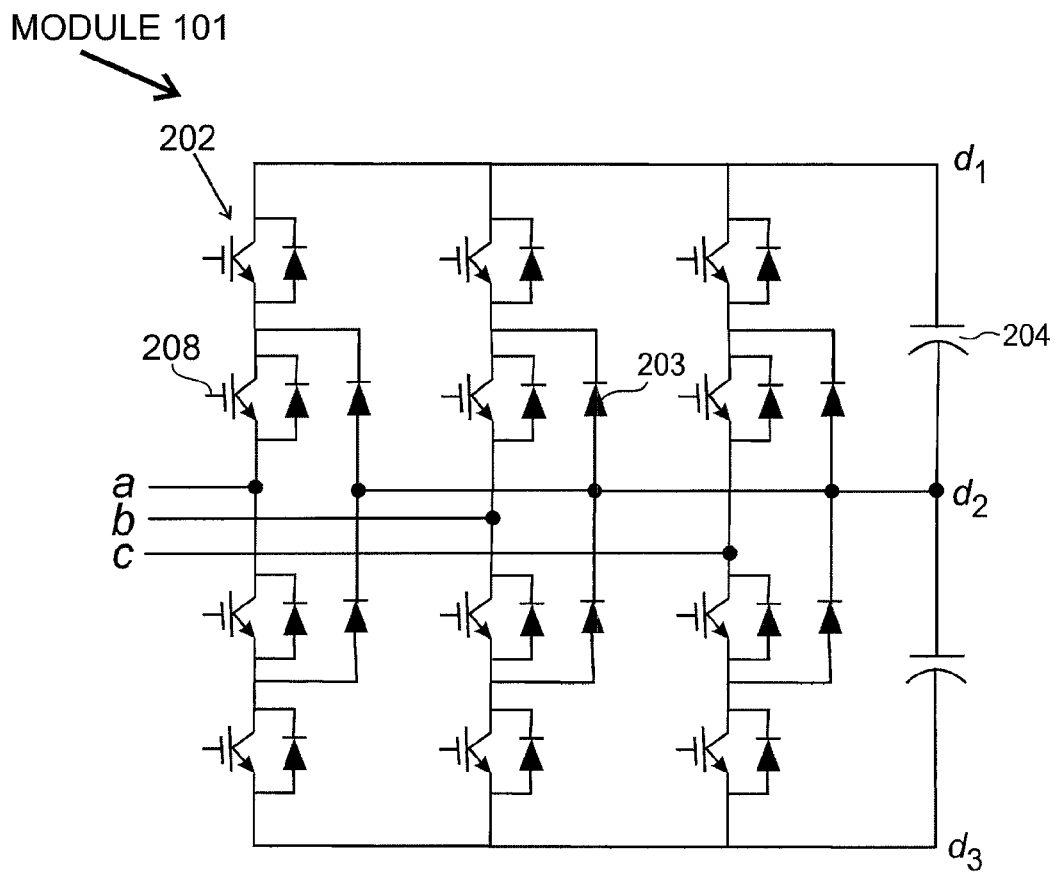

FIGS. 2A-B are schematic views depicting exemplary embodiments of module 101. It should be noted that each module 101 is not required to have a similar configuration. In fact, each module 101 can be configured as a different type of three-phased converter, if desired. Generally, the three-phase converter module 101 is a circuit containing various switches 202, diodes 203 and/or capacitors 204. Switches 202 are preferably a semiconductor switch for power applications, such as an Insulated Gate Bipolar Transistor (IGBT), Integrated Gate Commutated Thyristor (IGCT), Gate Turn-off Thyristor (GTO) and the like. One of skill in the art will readily recognize that semiconductor switch 202 can be any active front end and is not limited to the configurations explicitly set forth herein and depicted in the figures. Each switch 202 preferably includes at least one input 208, configured to receive control information generated by a controller for converter 100, which will be described in greater detail hereafter.

FIG. 2A depicts module 101 configured as a two-level voltage source converter (VSC). Here, three parallel branches each having two switches 202 are connected in parallel between terminal nodes d1 and d2. A load capacitor 204 is also coupled between terminal nodes d1 and d2. Each of the three AC terminal nodes a, b and c are coupled to a separate parallel branch to an intermediate node between adjacent switches 202.

FIG. 2B is a schematic view depicting another exemplary embodiment of module 101. Here, module 101 is configured as a three-level neutral point clamped converter (NPC). This embodiment includes a second set of switches 202, in addition to supplementary diodes 203 and an additional capacitor 204. The embodiments of FIGS. 2A-B are exemplary of the many different configurations of which module 101 can be implemented and, accordingly, module 101 should not be limited to the embodiments described with respect to FIGS. 2A-B.

Hexagram converter 100 has six AC ports 102 and can be used for various multi-level applications including both six-phase and three-phase applications. A non-exhaustive list of exemplary applications includes: power factor corrective rectifiers (PFCs), active power filters (APFs), static var compensators (STATCOMs) grid-connected inverters (GCIs), uninterruptible power supplies (UPSs), variable speed drives (VSDs), back-to-back converters, and the like.

Figure 3A:
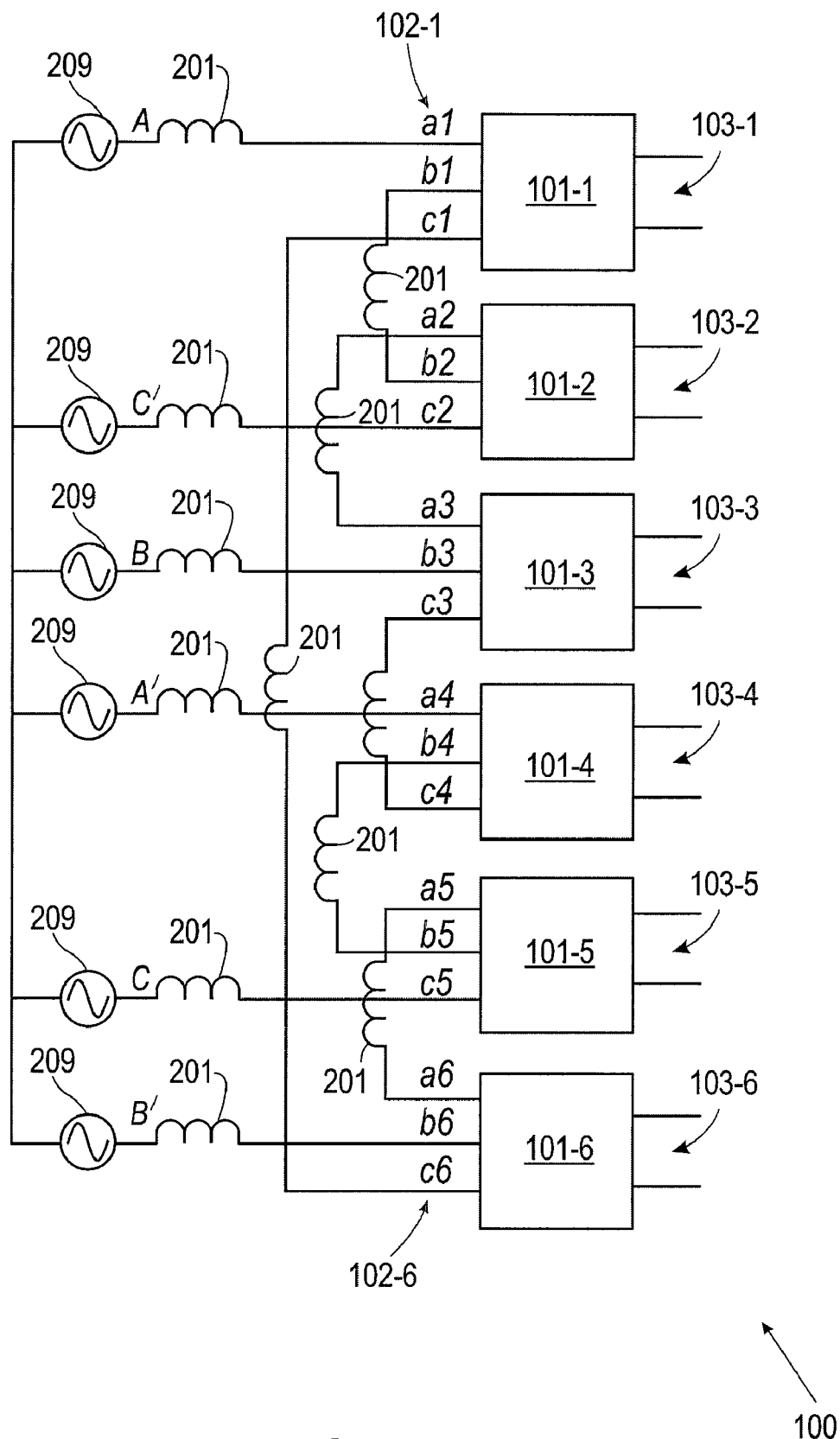
Figure 3B:
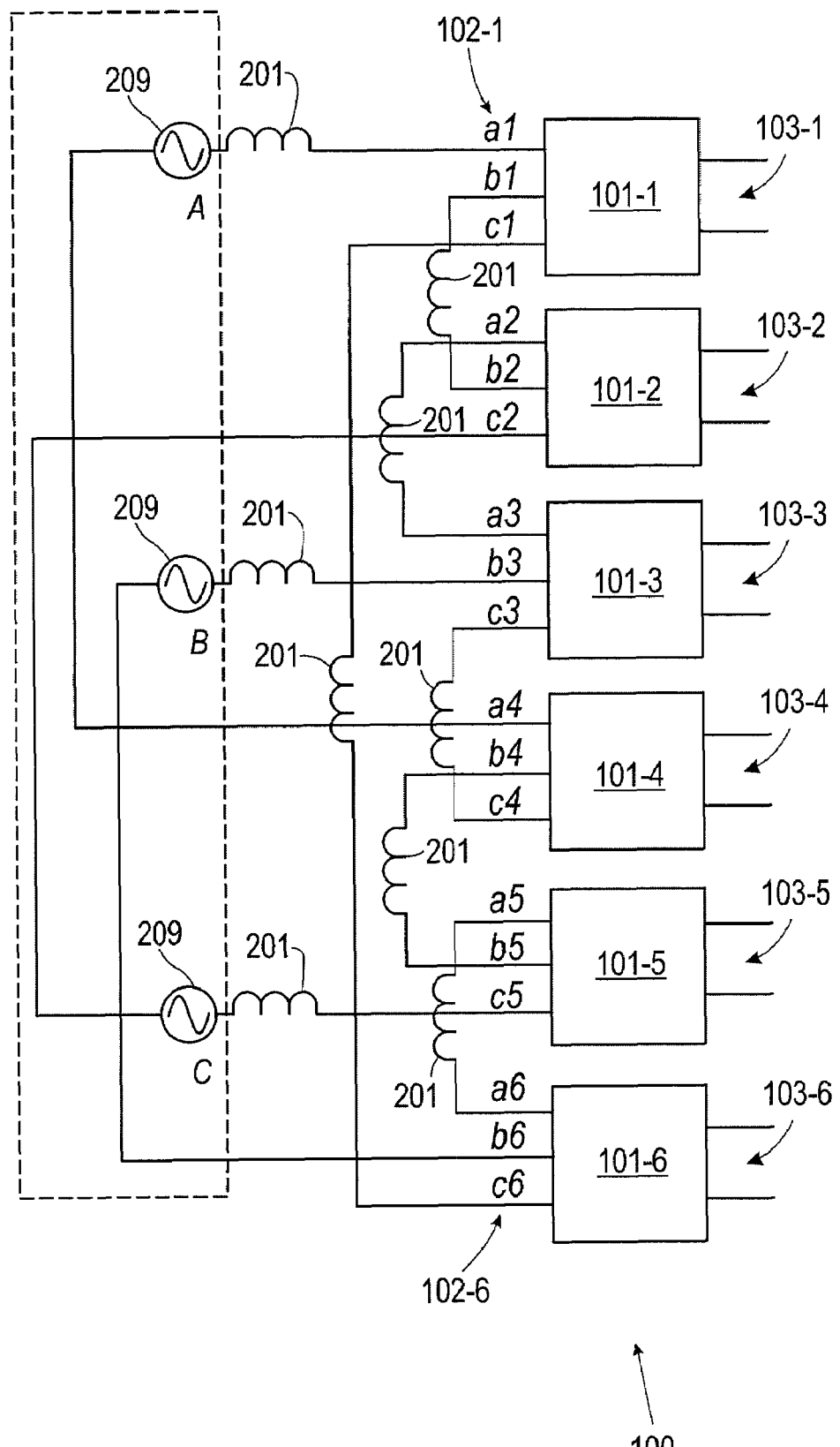

FIGS. 3A-B are schematic views depicting exemplary embodiments of converter 100 implemented in a six-phase configuration and a three-phase configuration, respectively. These embodiments of converter 100 are configured for use in APF, STATCOM or GCI applications and the like. In the six-phase configuration of FIG. 3A, each of the six AC output terminal nodes (A, A', B, B', C, and C') are preferably connected to sources or loads 209, each of which in turn being coupled with a common reference node or ground. When implemented in the three-phase configuration of FIG. 3B, the six AC output terminal nodes are preferably coupled with six terminal nodes provided by three-phase sources or loads 209. Here, AC terminal nodes a1 and a4 are used to provide the first phase (A), AC terminal nodes b3 and b6 are used to provide the second phase (B) and AC terminal nodes c5 and c2 are used to provide the third phase (C). The AC sources 209 can be a power grid through a transformer or a generator, for example. In these embodiments, DC ports 103 are preferably left open.

Figure 4A:
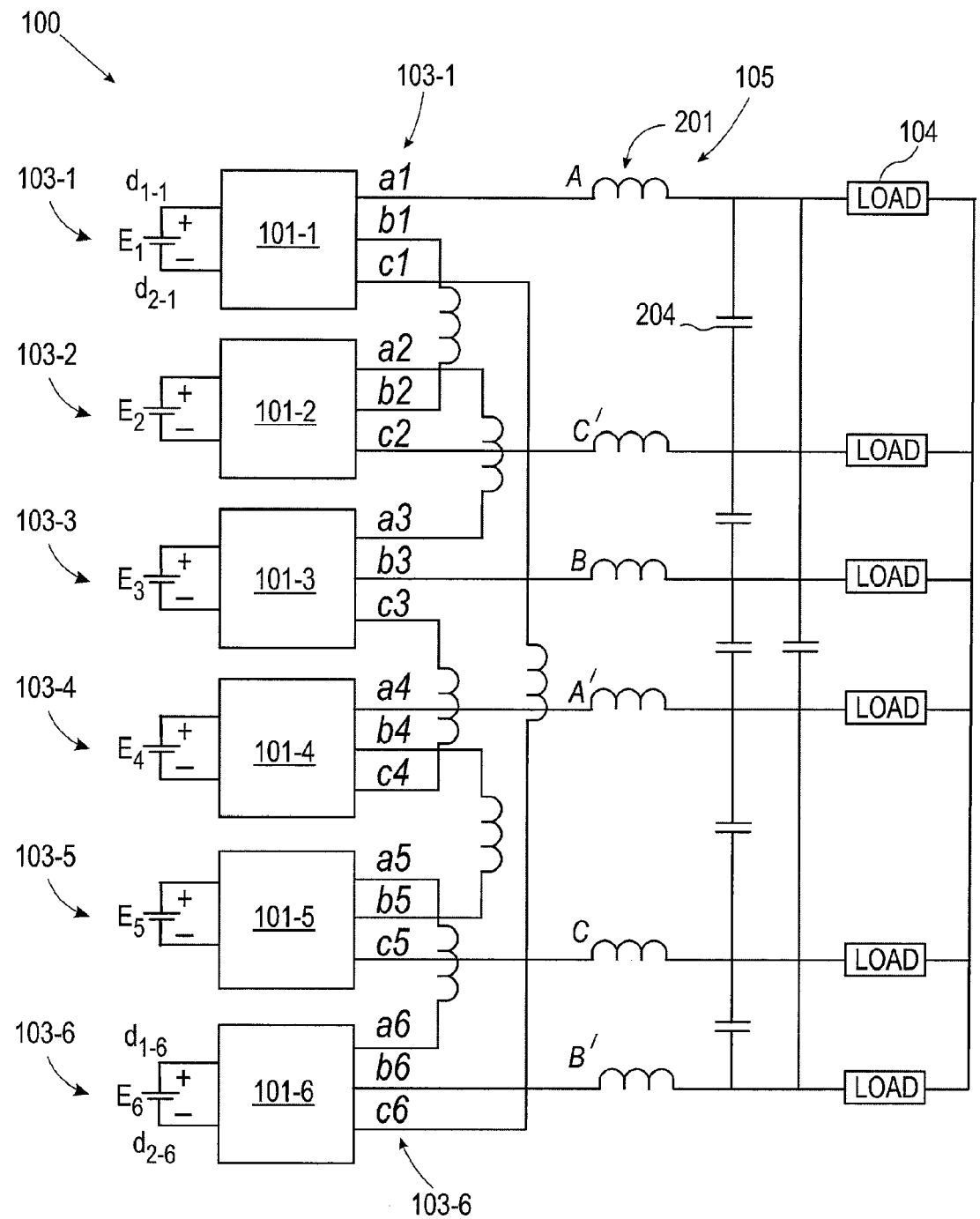
Figure 4B:
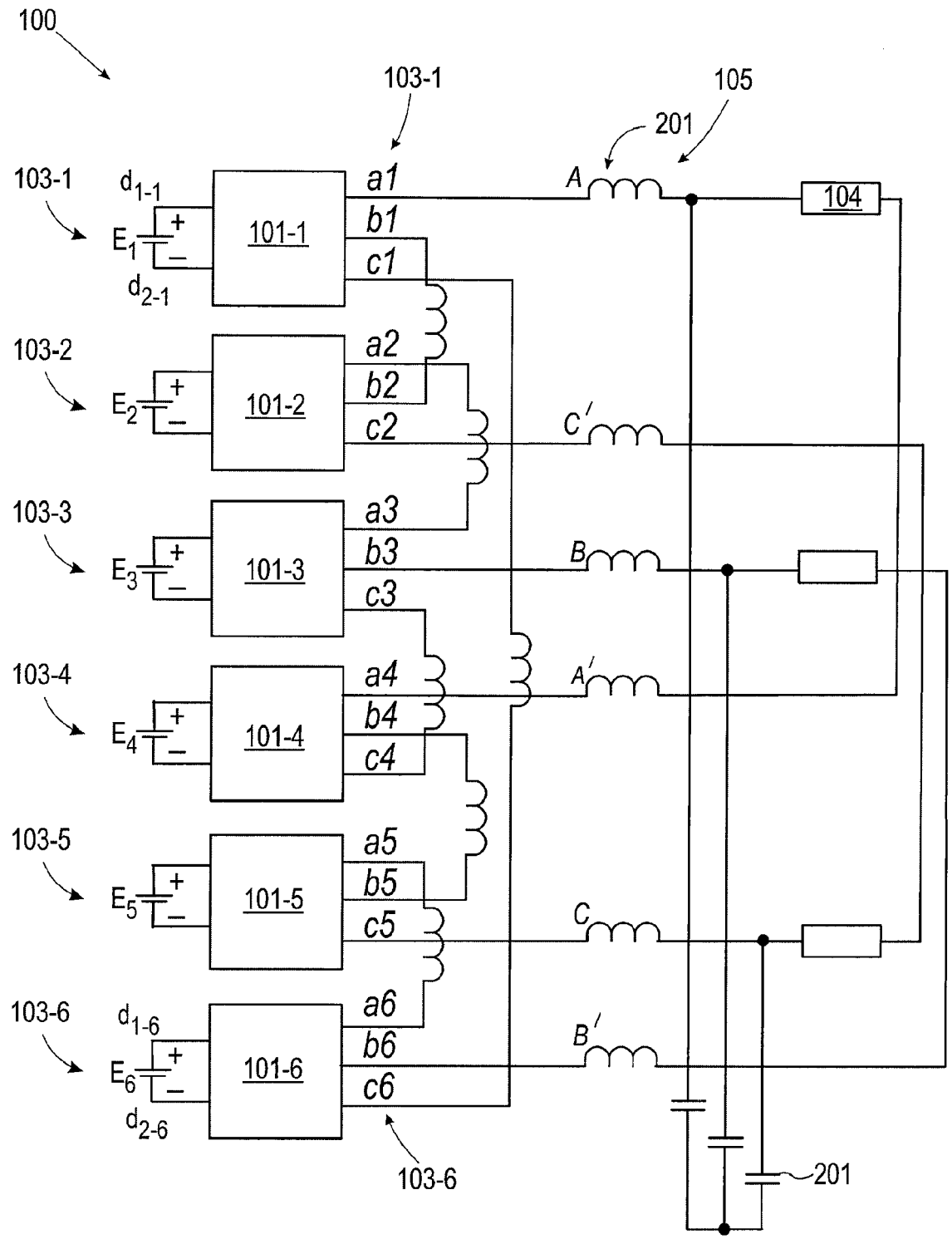

FIGS. 4A-B are schematic views depicting additional exemplary embodiments of converter 100 configured as a six-phase UPS and a three-phase UPS, respectively. In these embodiments, the DC terminal nodes d are coupled with DC sources such as batteries or renewable energy sources (e.g., a fuel cell through the isolated DC/DC converters, etc.). Other DC sources can also be used. AC ports 103 are connected to one or more loads 104 through an LC filter network 105 having multiple inductors 201 and capacitors 204. The LC filter network 105 is preferably second order or higher. Exemplary networks 105 are shown in FIGS. 4A-B, although other configurations of network 105 will be readily apparent to one of skill in the art. Capacitors 204 can be coupled in a ring configuration (as depicted in FIG. 4A) or a star configuration with a common reference node or ground (as depicted in FIG. 4B).

Figure 5A:
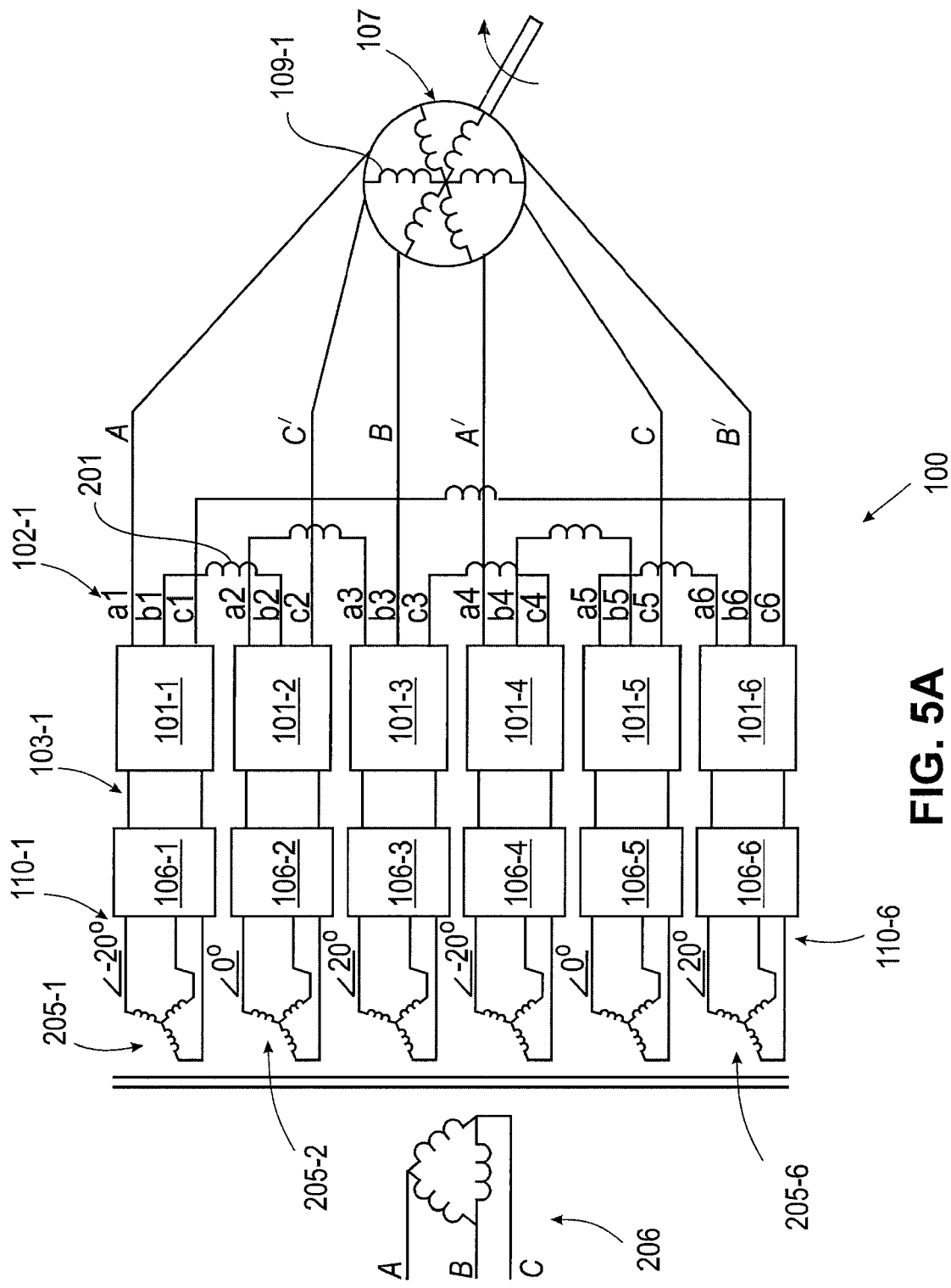
Figure 5B:
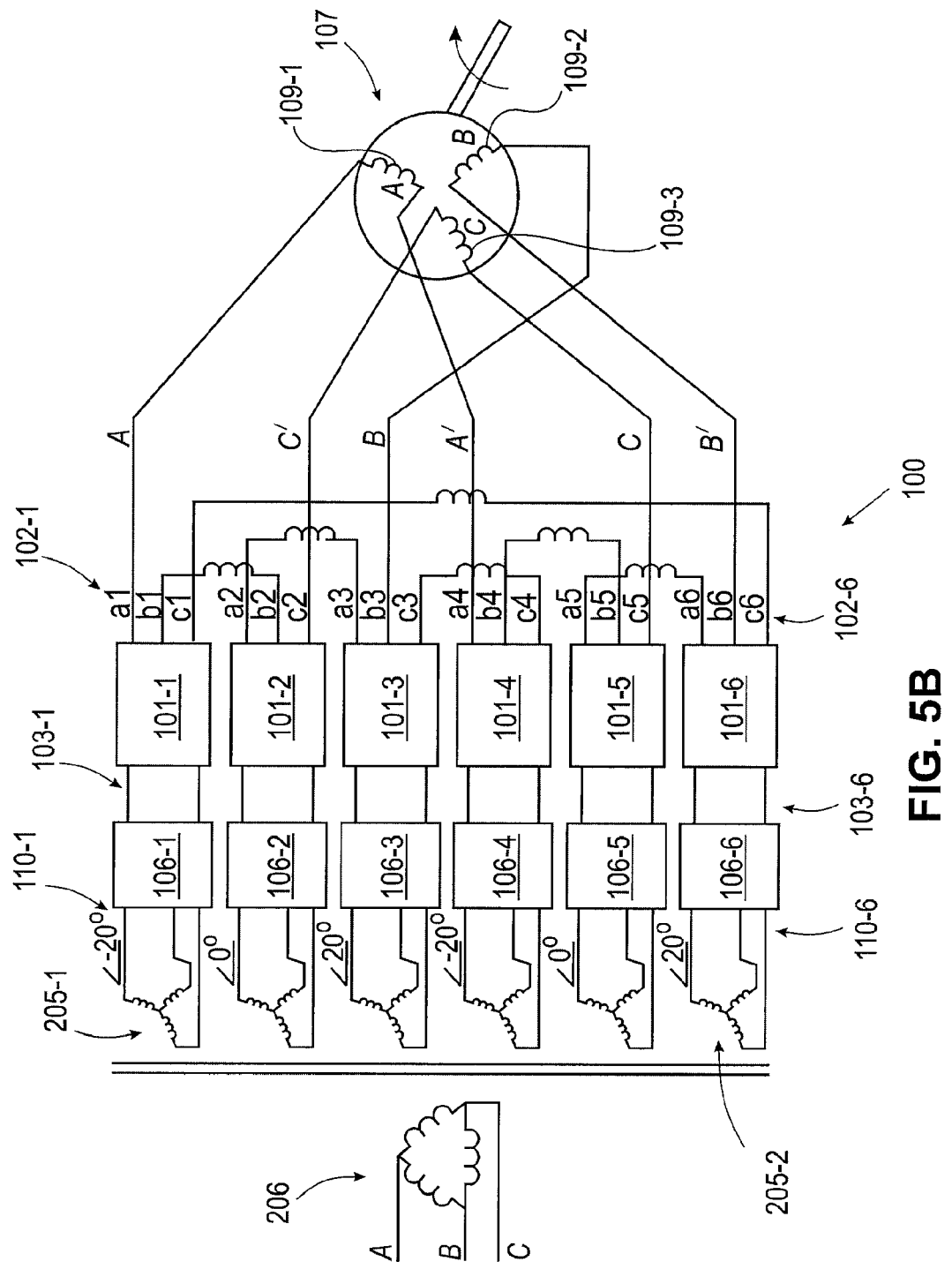

FIGS. 5A-B are schematic views depicting exemplary embodiments of hexagram converter 100 configured as a VSE. FIG. 5A depicts converter 100 configured for six-phase operation and FIG. 5B depicts converter 100 configured for three-phase operation. Included in these embodiments are multiple rectifiers 106 each of which is coupled with a DC port 103 of a respective module 101. Each rectifier 106 can be configured in any desired manner, such as with the use of diodes or other rectifying devices. Each rectifier 106 has a port 110 that is in turn coupled with an input isolation transformer 206 so as to together provide an isolated DC source to converter 100. Here, the secondary windings 205 of transformer 206 are configured to provide relative phase shift to improve the harmonic cancellation at the line (DC) side of converter 100. In this embodiment, winding 205-1 is configured to operate with a phase relatively 20 degrees less than winding 205-2, which in turn is configured to operate with a phase relatively 20 degrees less than winding 205-3. Windings 205-4 through 205-6 are configured in a similar manner as depicted in FIGS. 5A-B.

AC ports 102 on the opposite side of modules 101 are coupled with a motor load 107 having six input ports each connected with an AC output terminal node of modules 101. In FIGS. 5A-B, motor load 107 is configured as a six-terminal, six-phase or three-phase, respectively, permanent magnet synchronous motor (PMSM). Each of the input ports of motor load 107 is coupled with an inductive path 109, the opposite end of each inductive path 109, in turn, being coupled to a common reference point or ground. In the three phase configuration of FIG. 5B, motor load 107 includes three inductive paths 109 each having two ports coupled with the AC output terminal nodes of the various modules 101. In this embodiment, a first inductive path 109-1 has opposite ends each coupled with AC terminal nodes A and A', respectively. The ends of conductive path 109-2 are coupled with AC output terminal node B and B', likewise the ends of inductive path 109-3 are coupled with AC output terminal nodes C and C'. In both the embodiments of FIGS. 5A-B, the AC side of converter 100 can be equipped with or without a filter depending on the needs of the application (e.g., the motor requirements, etc.).

Figure 5C:
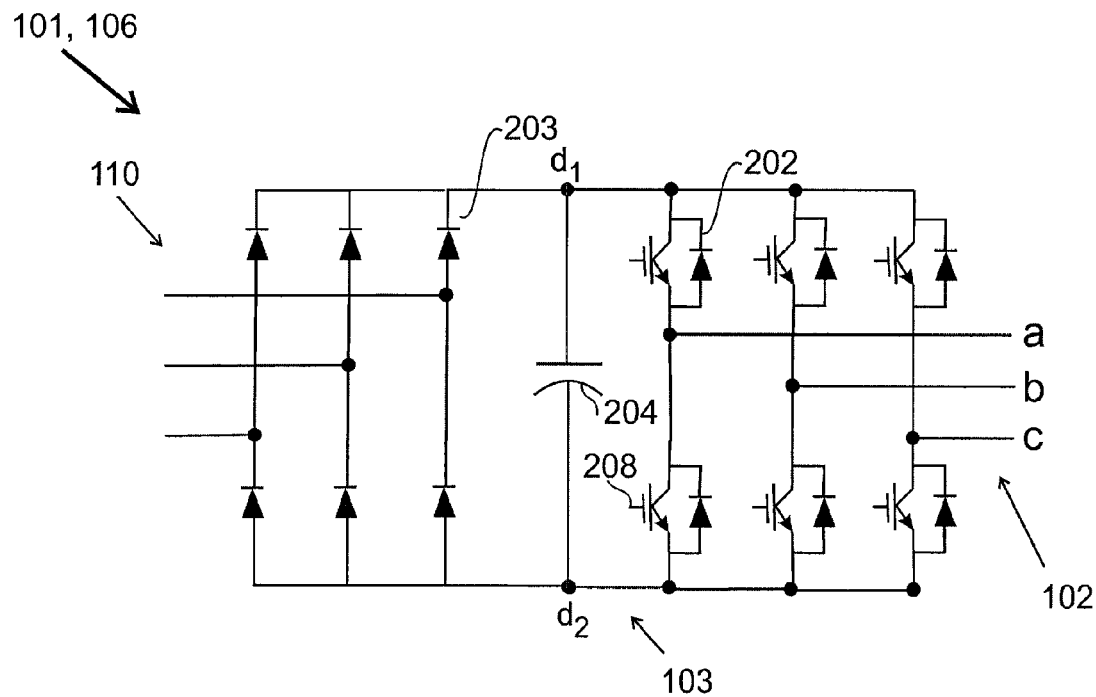

FIG. 5C is a schematic view depicting an exemplary embodiment of module 101 and rectifier 106. This embodiment is merely one example of the many ways in which rectifier 106 and module 101 can be implemented and is suitable for use with both the embodiments of FIGS. 5A-B. Here, each terminal node a, b, and c of AC port 102 is coupled to a different one of three parallel chains of semiconductor switches 202 located between nodes d1 and d2. Also coupled between nodes d1 and d2 is capacitor 204 and three parallel diode chains each having two diodes 203. The nodes coupled between each diode 203 of each chain together form the port 110 of rectifier 106.

Figure 6:
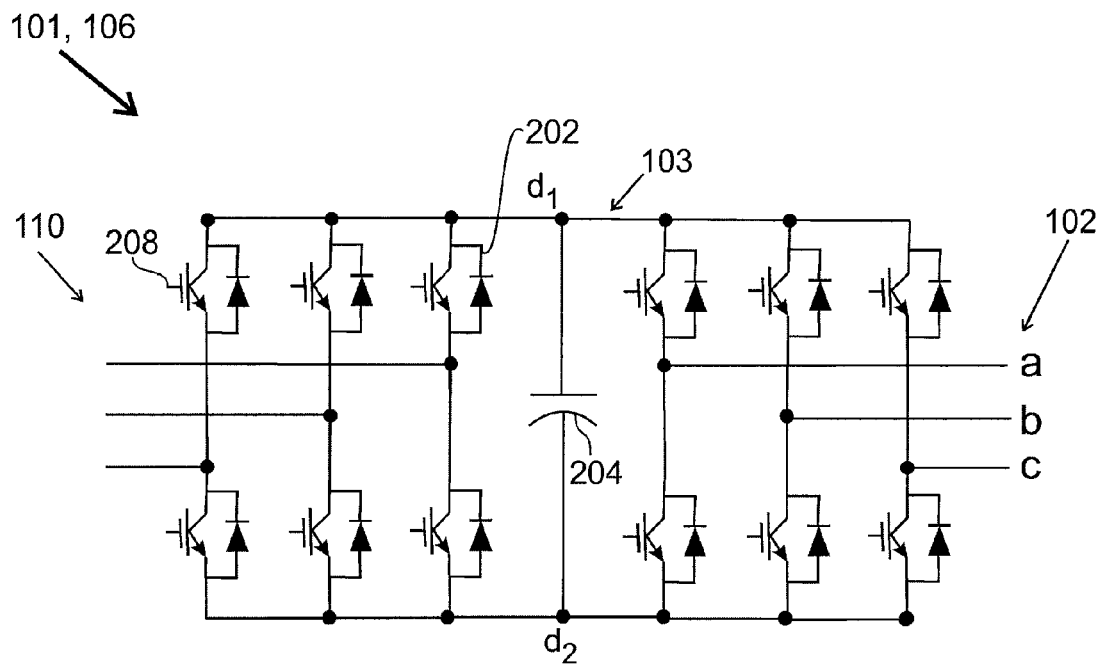

FIG. 6 is a schematic view depicting another exemplary embodiment of rectifier 106 in combination with module 101. This embodiment is similar to the embodiment described with respect to FIG. 5C except diodes 203 have been replaced with semiconductor switches 202. When the embodiment described with respect to FIG. 6 is implemented with the converter modules 101 of either the six-phase or three-phase VSD configurations of FIGS. 5A-B, converter 100 is capable of operating with regenerative braking, which recycles the energy from a motor during braking and send its back to the power grid.

Figure 7A:
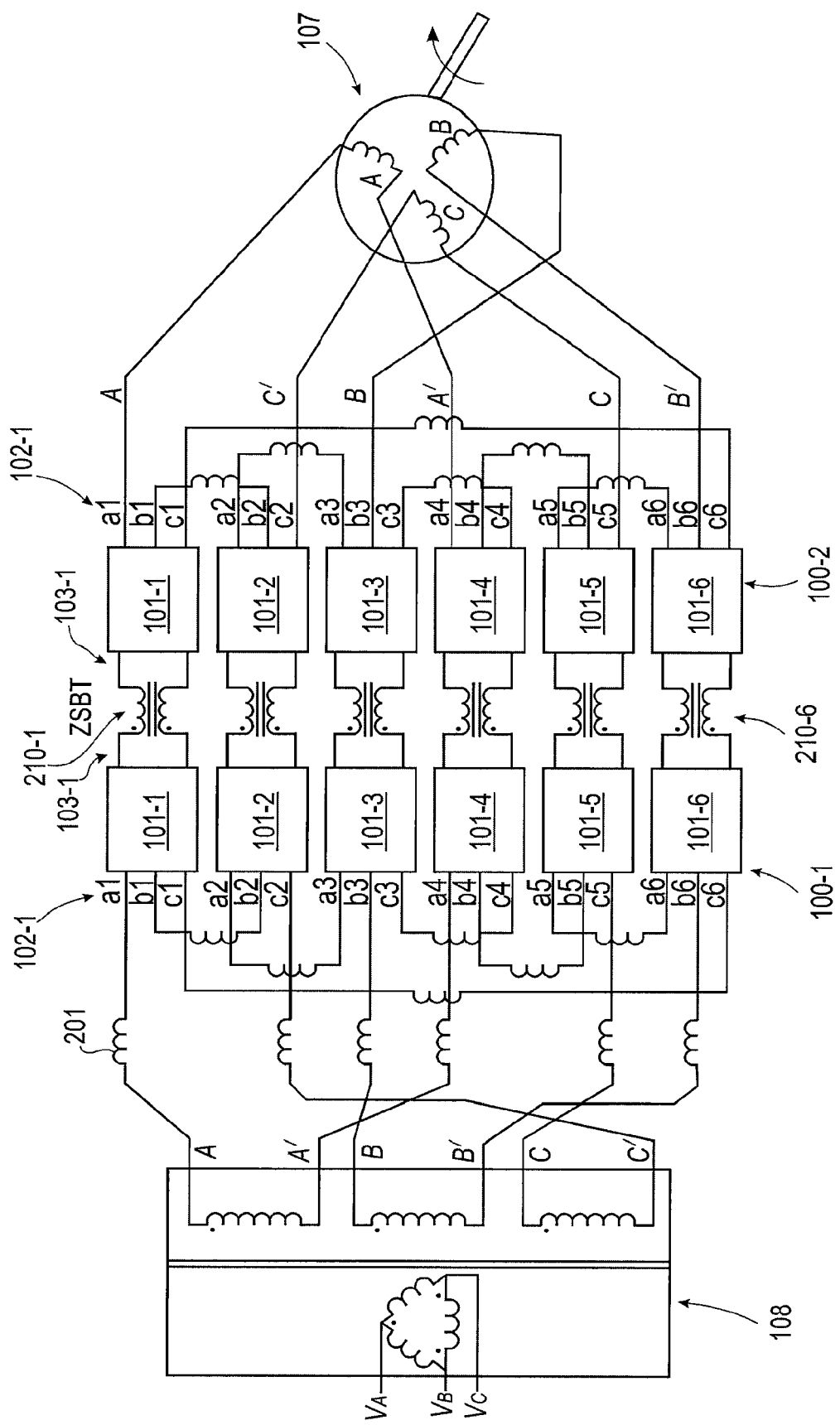
FIGS. 7A-B are schematic views depicting additional exemplary embodiments of hexagram converters configured for use in a high power application.
Figure 7B:
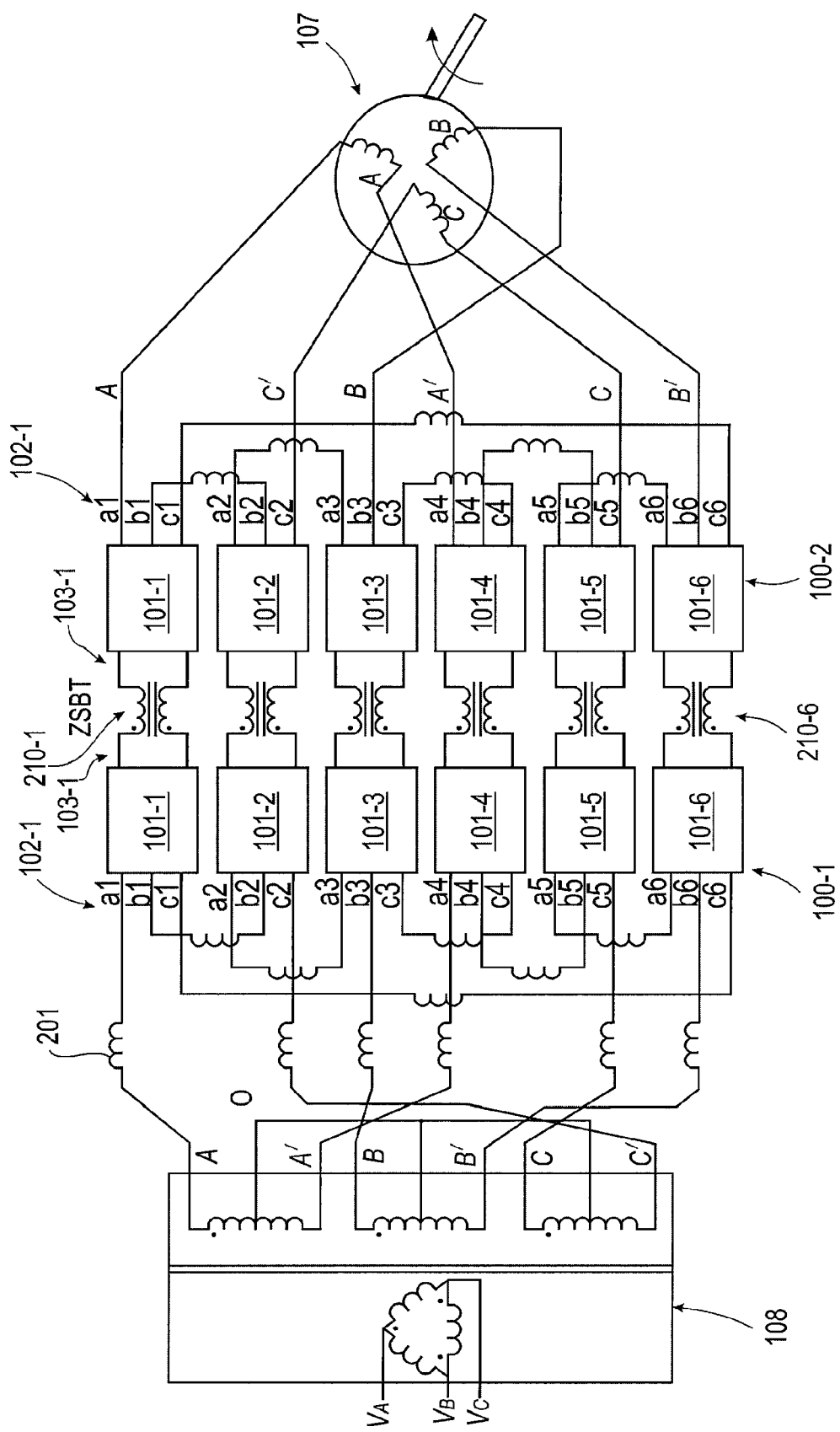

FIGS. 7A-B are schematic views depicting additional exemplary embodiments where two hexagram converters 100 are coupled together in a back-to-back fashion. This configuration has a wide range of applicability including, but not limited to, use in connecting two power grids together or a power grid with a separate electrical mechanism. In this embodiment, the power flow proceeds in a bi-directional manner. Here, the DC ports 103 of each respective module 101 are coupled together by way of a zero sequence blocking transformer (ZSBT) 210. ZSBT 210 is preferably to block any circulating current.

The AC ports 102 of converter 100-1 are coupled to power grid through isolation transformer 108 as shown. Because hexagram converter 100 has six AC output terminals, input isolation transformer 108 can be configured as a three-phase transformer with secondary windings in a neutral, unconnected state (as shown in FIG. 7A) or a three-phase transformer with secondary winding connected in a star configuration (as shown in FIG. 7B).

The AC ports 102 of converter 100-2 are in turn coupled with a motor load 107 in a three phase configuration similar to that depicted in FIG. 5B. As noted earlier, the embodiments described with respect to FIGS. 3A-B, 4A-B, 5A-C, 6 and 7 are examples of applications in which hexagram converter 100 can be implemented. The manner in which each embodiment is described and shown is merely one example in which converter 100 can be implemented for each particular application. It should be noted that numerous other configurations will be readily apparently to one of skill in the art based on the present disclosure. Furthermore, the embodiments described with respect to these figures do not constitute an exhaustive list of applications in which converter 100 can be used and one of skill in the art will readily recognize that many other applications are possible.

Figure 8:
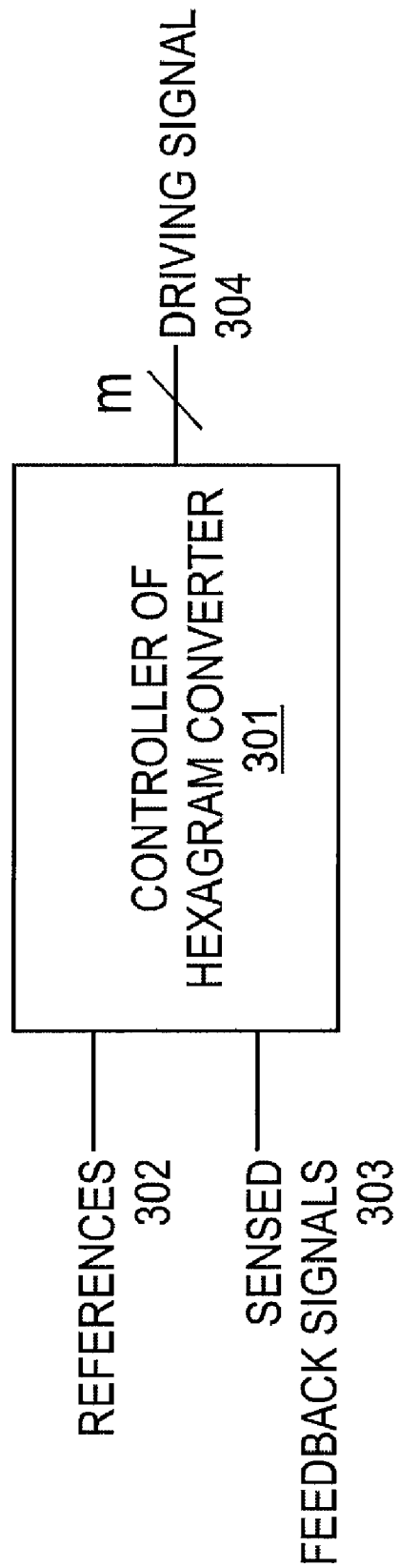
FIG. 8 is a block diagram depicting an exemplary embodiment of a controller for the hexagram converter.

Turning now to the control of hexagram converter 100, FIG. 8 is a block diagram depicting a preferred embodiment of a controller 301 for implementing the modulation methods and control schemes for converter 100. Preferably, converter 100 is operated by controlling the m-number of various switching devices 202 within each module 101 (e.g., by placing them in either an on or off state). It should be noted that there are hundreds of different combinations of control schemes and switching patterns that can be used to implement each application in which converter 100 is used. Because of the magnitude of possible schemes that can be used, it is not practical to describe them all herein. Instead, reference will be made to the diagrams of FIGS. 8-12. One of skill in the art will readily recognize variations to the controls schemes that can be used based on this description.

Referring back to FIG. 8, controller 301 is depicted having two input ports 302 and 303 and one control (e.g., driving) signal output port 304. Reference input port 302 is preferably configured to receive reference signals to controller 301 for providing information regarding the control or operative goal for the application. Feedback input port 303 is preferably used to input sensed feedback signals from the converter 100. Controller 301 outputs the m-number of driver signals on port 304, each of which is preferably used to control one or more switches 202, depending on the application. Controller 301 can be implemented in analog and/or digital circuitry.

Figure 9:
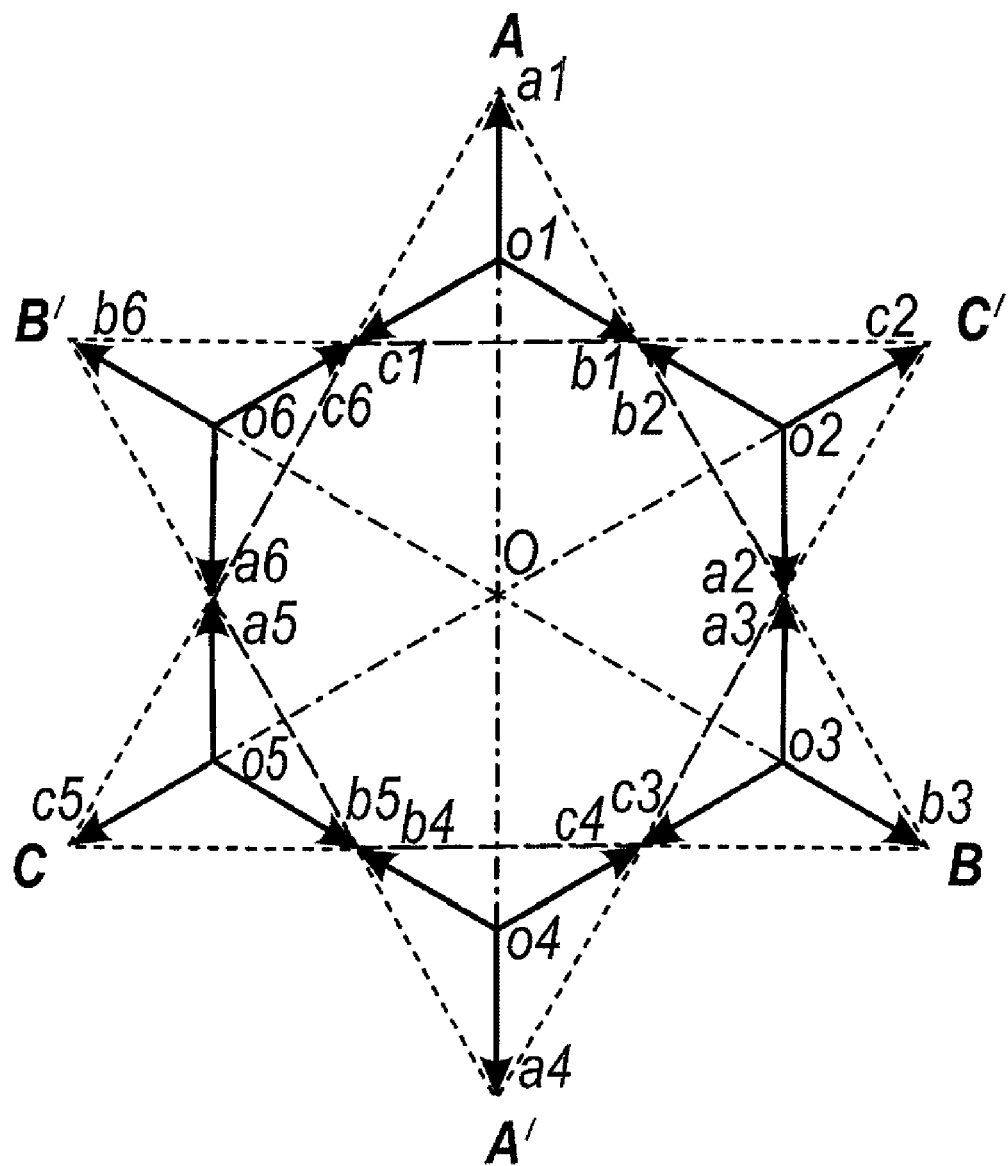
FIG. 9 is a phasor diagram depicting phase operation of an exemplary embodiment of the hexagram converter.

FIG. 9 is a voltage phasor diagram for an exemplary embodiment of hexagram converter 100. Phasor diagrams are commonly used within the art to illustrate the phase of a system as vectors within a plane and the phasor diagram of FIG. 9 depicts the various phase relationships for the AC ports signals 103 (a, b, c). One of skill in the art will understand that different control implementations will have varying performances. FIG. 9 depicts one embodiment of the operation of converter 100 where the converter 100 is relatively balanced and the voltages across the various conductors are relatively small. Equation (1) further describes the operation of converter 100 in this embodiment.

$$\begin{bmatrix} \dot{v}_{a1} \\ \dot{v}_{b1} \\ \dot{v}_{c1} \end{bmatrix} = \begin{bmatrix} \dot{v}_{a3} \\ \dot{v}_{b3} \\ \dot{v}_{c3} \end{bmatrix} = \begin{bmatrix} \dot{v}_{a5} \\ \dot{v}_{b5} \\ \dot{v}_{c5} \end{bmatrix} = -\begin{bmatrix} \dot{v}_{a2} \\ \dot{v}_{b2} \\ \dot{v}_{c2} \end{bmatrix} = \qquad (1)$$

$$-\begin{bmatrix} \dot{v}_{a4} \\ \dot{v}_{b4} \\ \dot{v}_{c4} \end{bmatrix} = -\begin{bmatrix} \dot{v}_{a6} \\ \dot{v}_{b6} \\ \dot{v}_{c6} \end{bmatrix} = \frac{1}{6}\begin{bmatrix} \dot{v}_{AA'} \\ \dot{v}_{BB'} \\ \dot{v}_{CC'} \end{bmatrix} = \begin{bmatrix} V\angle 0° \\ V\angle -120° \\ V\angle 120° \end{bmatrix}$$

Hexagram converter 100 can deviate from the operation depicted phasor diagram of FIG. 9 and the operation described in equation (1) if the implementation is not relatively balanced, voltages across inductors 201 are relatively large or there are other non-ideal significant factors in the system.

Figure 10:
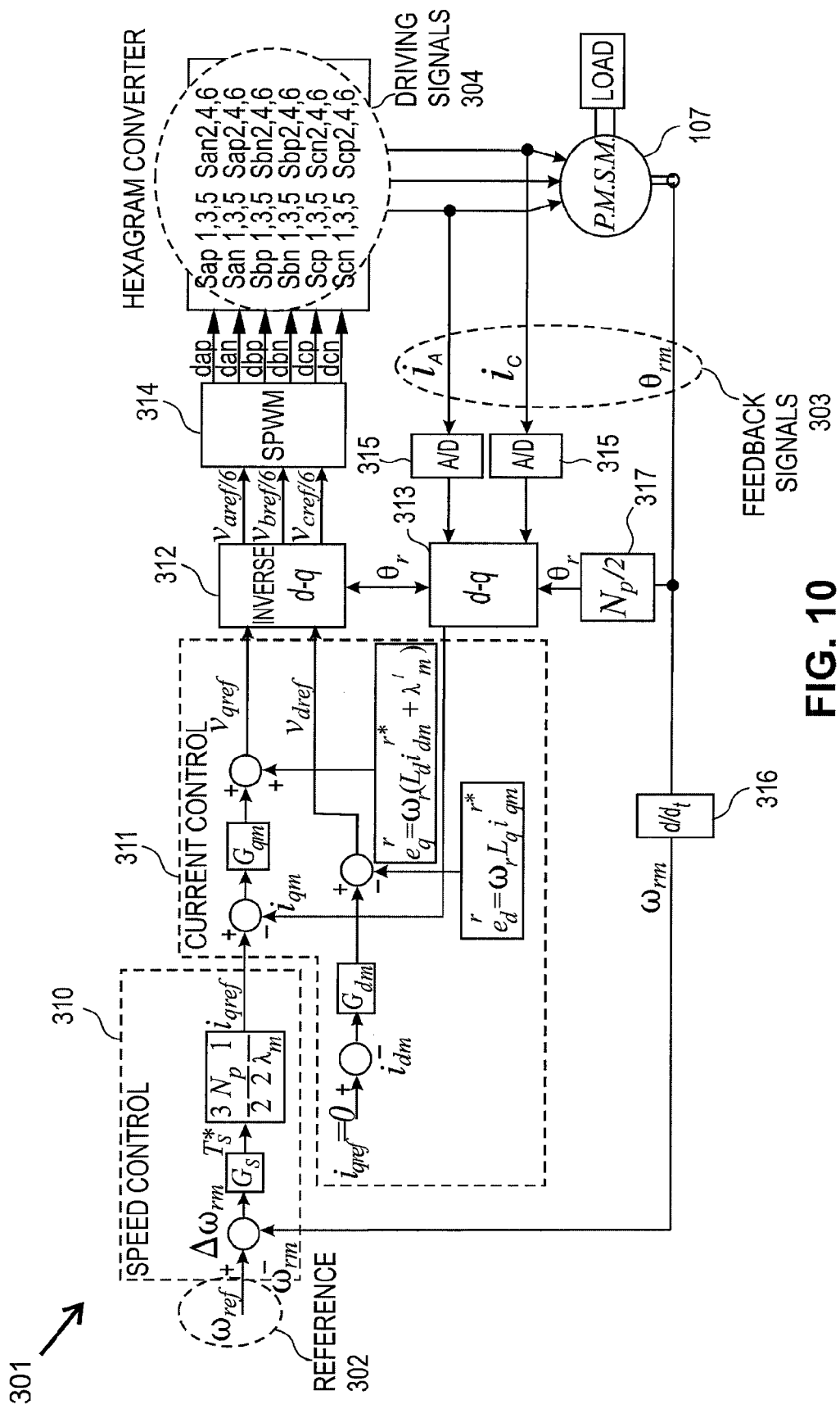
FIG. 10 is a block diagram depicting another exemplary embodiment of a controller for the hexagram converter.

FIG. 10 is a block diagram depicting an exemplary embodiment of a controller 301 for the embodiment of converter 100 described with respect to FIG. 5A as implemented with the six switch 202 module 101 as described with respect to the embodiment of FIG. 5C. Here, reference signal $\omega_{ref}$ is input to port 302 to provide the control reference for operation of converter 100. Feedback signals $\theta_{rm}$, $i_A$ and $i_B$ are input to port 303. Signal $\theta_{rm}$ is the sensed motor position and signals $i_A$ and $i_B$ are phase currents from converter 100. Thirty-six driving signals are output from port 304, each preferably coupled to a separate switch 202.

This embodiment of controller 301 applies control techniques that are standard in the field. Here, controller 301 includes a speed control unit 310, a current control unit 311, an inverse d-q conversion unit 312, a d-q conversion unit 313, a sinusoidal pulse width modulation (SPWM) unit 314, two analog-digital converters 315, a d/dt unit 316 and an Np/2 unit 317. Speed control unit 310 generates $i_{qref}$ according to the speed reference signal $\omega_{ref}$ and the feedback signals $\theta_{rm}$, $i_A$ and $i_B$ to control the speed of motor load 107. Current control unit 311 is preferably configured to drive the $i_{dm}$ and $i_{qm}$ to follow $i_{dref}$ and $i_{qref}$ in order to control the torque of motor load 107.

By controlling the signal $i_{dm}$ such that it resides near zero, the torque on motor load 107 is proportional to the signal $i_{qm}$. From the reference and feedback signals, the voltage reference signals $v_{qref}$ and $v_{dref}$ can be determined. SPWM unit 314 is used to generate the driving signals and port 304. Controller 301 can be configured, as shown here, to satisfy the voltage relationships in the phasor diagram of FIG. 9 and the speed control of PMSM 107 can be achieved.

Figure 11:
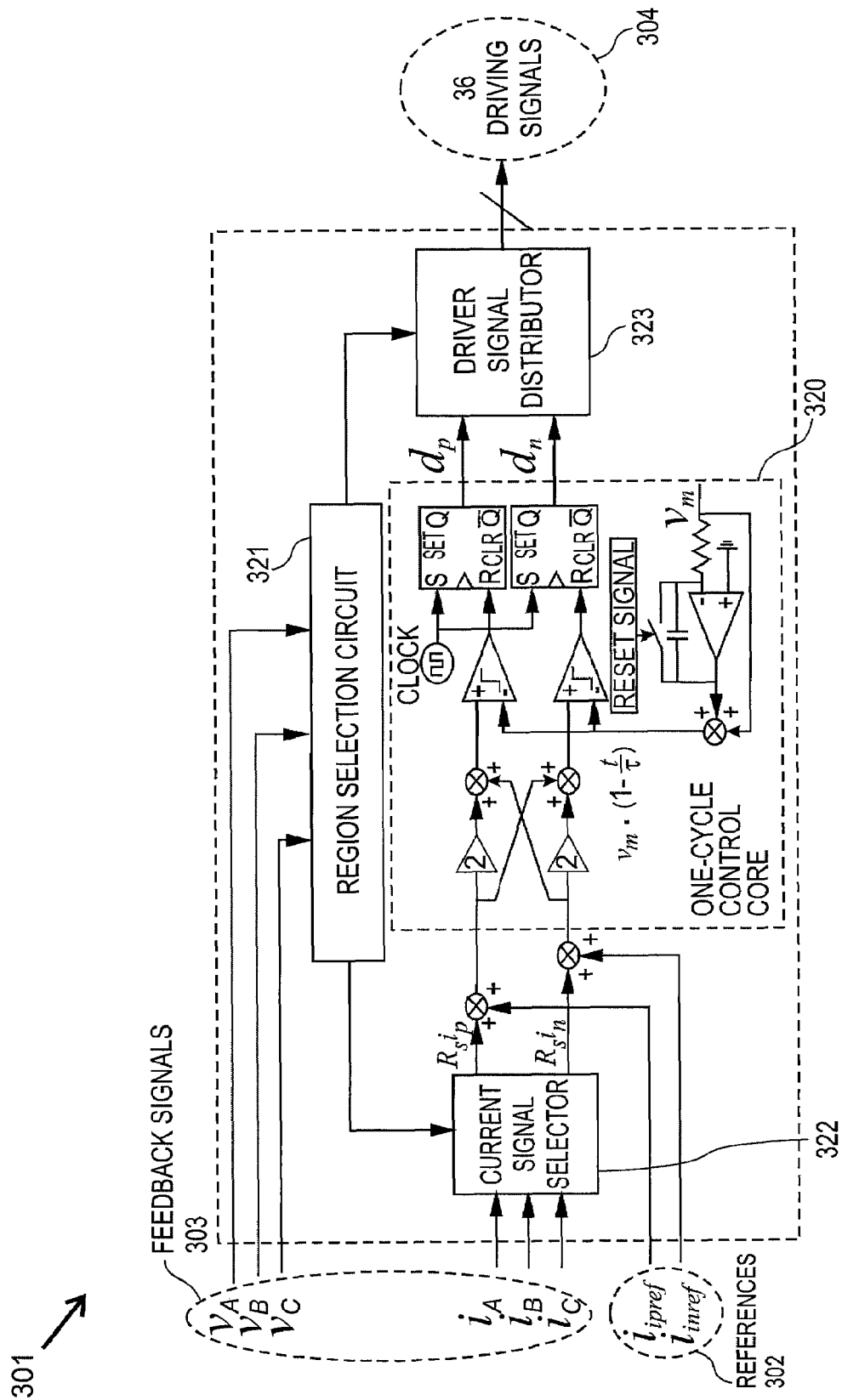
FIG. 11 is a block diagram depicting another exemplary embodiment of a controller for the hexagram converter.

FIG. 11 is a block diagram depicting an exemplary embodiment of controller 301 for the embodiment of converter 100 described with respect to FIG. 3B as implemented with the six switch 202 module 101 as described with respect to the embodiment of FIG. 2A. In this embodiment, a one-cycle control (OCC) core 320 is employed to control converter 100 in a STATCOM application. Here, reference signals $i_{pref}$ and $i_{nref}$ are input to port 302 to provide the control reference to set the amount of compensated VAR for operation of converter 100. Sensed feedback voltage signals $v_A$, $v_B$ and $v_C$ and sensed feedback current signals $i_A$, $i_B$, and $i_C$ are input to port 303. Thirty-six driving signals are output from port 304, each preferably coupled to a separate switch 202.

Control of multi-level converters with an OCC topology is described in detail in U.S. Pat. No. 6,545,887, which is expressly incorporated by reference herein. In addition to OCC core 320, controller 301 includes region selection circuit 321, current signal selector 322 and drive signal distributor 323. According to the voltage feedback signals $v_A$, $v_B$ and $v_C$, region selection circuit 321 determines the vector region and current signal selector 322 selects the vector currents from current feedback signals $i_A$, $i_B$, and $i_C$. The vector currents can be used to calculate the duty ratio drive signals by OCC core 320. Drive signal distributor 323 preferably distributes the drive signals to the associated switches 202.

Again, controller 301 can be configured, as shown here, to satisfy the voltage relationships in the phasor diagram of FIG. 9 and the speed control of PMSM 107 can be achieved. It should be noted that although the embodiments described with respect to FIGS. 10-11 are separate implementations of controller 301, numerous other potential implementations exist compliant with the overall topology described with respect to FIG. 8.

When implementing hexagram converter 100, it is generally desirable to include fault protection capability in the form of hardware and/or software implementations. Accordingly, one of skill in the art will readily recognize that converter 100 can be configured to operate with these various protections. These protections generally include detection and identification of the fault, isolation of the fault devices and reconfiguration of the converter system. Post-fault control algorithms are also typically included as part of the protection.

Figure 12:
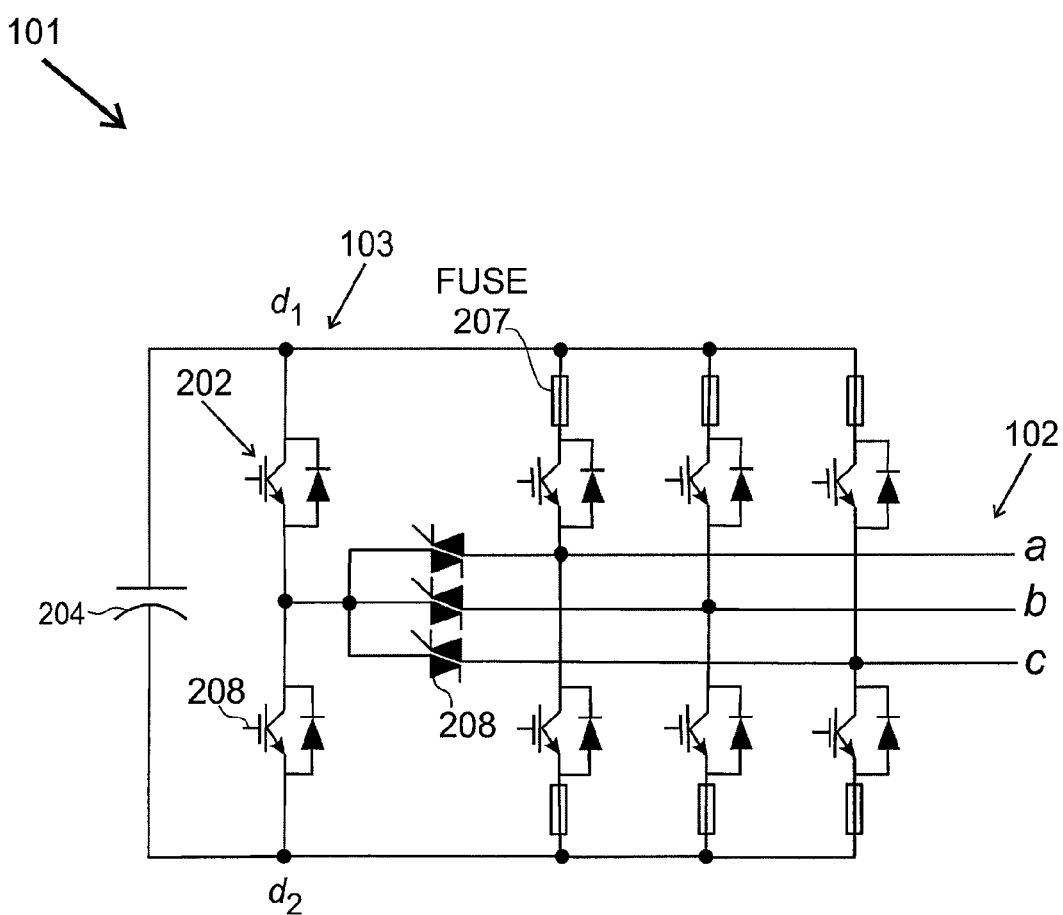
FIG. 12 is a schematic view depicting another exemplary embodiment of a converter module for the hexagram converter.

For instance, FIG. 12 is a schematic view depicting an exemplary embodiment of module 101 configured for fault protection when used with the embodiment described with respect to FIG. 5B. Here, each AC terminal node (a, b, c) is coupled with a fault protection device 208. Here, fault protection device 208 is configured as a TRIAC, which is a bidirectional electronic switching device that can conduct current in either direction when triggered. The opposite node of each device 208 is coupled with a chain of two switches 202, one of which is, in turn, coupled to node d1 and the other, in turn, coupled to node d2. Capacitor 204 is also coupled between nodes d1 and d2. Each AC terminal node is in turn coupled with a separate chain of switches 202 coupled between nodes d1 and d2. Each switch 202 is in series with fuse 207, as shown. Some of the protections of this embodiment of module 101 include (but are not limited to) protection against one switch short, one leg short, one switch open and one leg open fault conditions. This embodiment is just one possible hardware configuration that can be used to protect hexagram converter 100. Other embodiments can be more complex, including detection circuits and control algorithms that can be implemented by software and circuit reconfiguration via hardware. One of skill in the art will readily recognize the many variations that exist based on the present disclosure.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure.

What is claimed is:

1. A power system, comprising:
    a multilevel power converter, comprising six three-phase converter modules, each module comprising an AC port having at least three terminal nodes and a DC port having at least two terminal nodes, wherein each module is configured to consume one-sixth of the converter's output power and wherein each module is coupled to a different set of two of the six modules by way of first and second terminal nodes, respectively, of the at least three terminal nodes of the AC port.

2. The system of claim 1, wherein each module is coupled to the two different modules by way of an inductive path.

3. The system of claim 2, wherein each module comprises a plurality of semiconductor switches.

4. The system of claim 3, wherein at least one semiconductor switch is coupled between each of the at least three terminal nodes of the AC port and a terminal node of the DC port.

5. The system of claim 4, wherein each semiconductor switch is configured as one of the following: an IGBT, an IGCT, or a GTO.

6. The system of claim 3, wherein each module comprises a plurality of diodes.

7. The system of claim 3, wherein each module comprises:
a first branch having a first and a second semiconductor switch coupled in series between a first and a second terminal node of the DC port, a first terminal node of the AC port being coupled between the first and second switches;
a second branch having a third and a fourth semiconductor switch coupled in series between the first and second terminal nodes of the DC port, a second terminal node of the AC port being coupled between the third and fourth switches; and
a third branch having a fifth and a sixth semiconductor switch coupled in series between the first and second terminal nodes of the DC port, a third terminal node of the AC port being coupled between the fifth and sixth switches.

8. The system of claim 7, wherein each module is coupled with a controller configured to control operation of the converter.

9. The system of claim 8, wherein the controller is configured to output a plurality of control signals to each module.

10. The system of claim 9, wherein each switch is configured to receive one of the control signals output from the controller.

11. The system of claim 10, wherein the controller is configured to output one separate control signal for each switch.

12. The system of claim 6, wherein each module further comprises a fourth branch having a load capacitor coupled between the first and second terminal nodes of the DC port.

13. The system of claim 4, wherein each module is coupled with a controller configured to control operation of the converter.

14. The system of claim 13, wherein the controller is configured to output a plurality of control signals to each module.

15. The system of claim 14, wherein the controller is configured to output one separate control signal for each switch.

16. A power system, comprising:
a multilevel power converter, comprising six three-phase converter modules, each module comprising an AC port having at least three terminal nodes and a DC port having at least two terminal nodes, wherein each module is coupled to two different modules by way of first and second terminal nodes, respectively, of the at least three terminal nodes of the AC port,
a first interconnection comprising a first inductor and being coupled with a first AC terminal of a first module and a first AC terminal of a second module;
a second interconnection comprising a second inductor and being coupled with a second AC terminal of the first module and a first AC terminal of a sixth module;
a third interconnection comprising a third inductor and being coupled with a second AC terminal of the second module and a first AC terminal of a third module;
a fourth interconnection comprising a fourth inductor and being coupled with a second AC terminal of the third module and a first AC terminal of a fourth module;
a fifth interconnection comprising a fifth inductor and being coupled with a second AC terminal of the fourth module and a first AC terminal of a fifth module; and
a sixth interconnection comprising a sixth inductor and being coupled with a second AC terminal of the fifth module and a second AC terminal of the sixth module.

17. The system of claim 16, wherein a third AC terminal of each module is an AC output terminal coupled with external circuitry.

18. The system of claim 1, wherein each module is coupled with a controller configured to control the operation of the respective module.

19. The system of claim 1, wherein the controller is configured to generate a plurality of driving signals for the converter based on at least one received reference signal and at least one feedback signal.

20. The system of claim 1, wherein each module comprises fault protection circuitry.

21. The system of claim 1, wherein each set of two of the six modules to which one of the six modules is coupled includes first and second modules positioned adjacent the one of the six modules.

22. The system of claim 1, wherein the six modules are configured as a hexagram.

* * * * *